2,995,422
PROCESS OF PREPARING SILICEOUS PIGMENTS

George H. Atkinson, Akron, and Franklin Strain, Barberton, Ohio, assignors, by mesne assignments, to Pittsburgh Plate Glass Company
No Drawing. Filed Oct. 8, 1957, Ser. No. 688,837
12 Claims. (Cl. 23—110)

This invention relates to the preparation of siliceous pigments. More particularly, the instant discovery concerns the reaction of an alkali metal silicate slurry to produce a siliceous pigment useful, among other things, to improve the optical properties, such as opacity, of paper.

It is known, for instance, that an aqueous alkali metal silicate solution may be reacted with an alkaline earth metal salt, such as calcium chloride, to prepare an alkaline earth metal silicate pigment. Furthermore, it is also known that an aqueous sodium silicate solution, for example, may be reacted with an acid, such as HCl, to precipitate silica. However, controlling these reactions in order to determine the ultimate physical structure of the product has always been a severe problem, in view of the fact that gel-type siliceous products or highly-agglomerated particulates having a wide range of particle sizes generally result.

According to the present invention, however, a novel process has been discovered whereby a siliceous pigment of predetermined size and unusual uniformity of particle size may be prepared by reacting an aqueous slurry of alkali metal silicate with a compound having a cation which will replace the alkali metal of the silicate.

Numerous advantages accrue from the process of the present invention. It has been found, according to the instant discovery, that by reacting an aqueous slurry containing solid sodium silicate, for instance, with a compound having a cation which will replace the alkali metal of the silicate, a most effective way of controlling the particle size of the ultimate siliceous pigment is provided. In other words, the present invention affords an unprecedented method of preparing a very desirable pigment of predetermined and uniform size.

According to a preferred embodiment of the present invention, an aqueous slurry of alkali metal silicate is prepared by admixing an aqueous alkali metal silicate solution, such as a sodium silicate solution, with enough alkali metal chloride, such as NaCl, to cause precipitation of alkali metal silicate. The resulting slurry is reacted with a compound having a cation which replaces the alkali metal of the silicate. Among the compounds particularly suited for reacting with the silicate slurry to produce the siliceous pigments contemplated herein are water-soluble alkaline earth metal salts, such as $CaCl_2$, $SrCl_2$, $BaCl_2$, $CaBr_2$, $SrBr_2$, and other salts having a cation which replaces the alkali metal of the silicate, e.g., $AlCl_3$, $MgCl_2$, and the like.

Alternatively, the alkali metal silicate precipitate may be reacted with acids or acidic materials, such as carbon dioxide or an acid salt thereof, such as sodium bicarbonate. Other acids or acidic materials which are water-soluble and which may be used include: hydrochloric acid, sulphuric acid, phosphoric acid, sulphurous acid, nitric acid and acetic acid, as well as the acid or partially-neutralized alkali metal salts of such acids, such as ammonium bicarbonate, sodium acid sulphate, disodium acid phosphate, and the like.

Any other acidic material which reacts with alkali metal silicate to neutralize the alkali thereof may be used. Normally, the acids used are mineral acids or their acidic salts, although any acid or acidic material capable of reacting with aqueous alkali can be used.

It has been found, according to the present invention, that by establishing an aqueous mixture of alkali metal chloride and alkali metal silicate, wherein the alkali metal chloride is present in the solution mixture at a concentration ranging from at least 75 grams per liter and up to about 250 grams per liter, preferably from about 90 to 200 grams per liter, an alkali metal silicate precipitate is formed which, when reacted with an alkaline earth metal salt, for instance, such as calcium chloride, produces an alkaline earth metal silicate having an average ultimate particle size ranging from 0.2 to 0.7 micron. This product affords substantially improved opacity and brightness values in paper, for example.

The present invention will be better understood from the following examples, although its scope is by no means limited to the details thereof:

Example I

Fifty milliliters of an aqueous sodium silicate solution containing 239 grams $SiO_2$ per liter and having an $SiO_2$ to $Na_2O$ mol ratio of 3.21 was poured slowly from a graduate into a two-liter beaker having therein a liter of brine containing 100 grams NaCl. The mixture was stirred vigorously with a spatula and the resulting batch left standing overnight to allow complete precipitation and settling. Subsequently, the slurry solids were removed by filtration and reslurried in 300 milliliters of an aqueous calcium chloride solution containing 100 grams $CaCl_2$ per liter and 40 grams NaCl per liter, the mixture stirred well and allowed to stand for an hour.

Solids thus precipitated from solution were removed by filtration and then dried at 105° C. The resulting dry filter cake was soft, white and comprised calcium silicate having an average utimate particle size of about 0.2 to 0.4 micron and a BET (Brunauer-Emmett-Teller) surface area of 114 square meters per gram. A chemical analysis of the material showed it to contain 65.7 percent by weight $SiO_2$ and 13.2 percent by weight CaO; the calcium silicate had an $SiO_2/CaO$ mol ratio of 4.64 and may be represented by the formula $CaO(SiO_2)_{4.64}$.

Example II

The reaction of sodium silicate and brine was carried out the same way as in Example I above, only the brine contained 200 grams (NaCl) per liter instead of 100. The resulting dried product was soft, white and had an average ultimate particle size of about 0.2 to 0.4 micron and a BET surface area of 9 square meters per gram.

Example III

One hundred milliliters of an aqueous solution of sodium silicate containing 100 grams ($SiO_2$) per liter was added to 1000 milliliters of brine containing 200 grams NaCl per liter as in the above examples, the silicate having an $SiO_2/Na_2O$ mol ratio of 3.22. The resulting precipitate, when dried, was soft, white and had an average ultimate particle size of about 0.5 to 0.6 micron and a BET surface area of 8 square meters per gram.

According to the present invention, the $SiO_2$ concentration in the reaction mixture may range from as low as about 1 gram per liter up to about 45 grams per liter, based upon the total volume of the reaction mixture, preferably from about 10 to 45 grams $SiO_2$ per liter. Furthermore, although sodium silicate is typical of the alkali metal silicate useful in the present invention, other alkali metal silicates, such as potassium silicate, may be employed.

An alkali metal silicate having an $SiO_2/MO$ ratio of about 3.20, where M is an alkali metal, is preferred in the process of the instant invention; but, however, the discovery is by no means limited thereto, since silicates having an $SiO_2$ to metal oxide mol ratio ranging from 2 to 3.8 are contemplated.

It has been discovered, also, that where a sodium silicate having an $SiO_2/Na_2O$ mol ratio of 3.20 is reacted according to Example I, above, the resulting calcium silicate has a mol ratio represented by the formula $$CaO(SiO_2)_{4.64}$$

Consequently, there is an increase in the $SiO_2$ molecular ratio as a result of the instant process.

The surface area of the products produced by the present discovery is measured by the BET (Brunauer-Emmett-Teller) method. The instant invention affords a process whereby the surface area of the pigment may be controlled. This fact is evident from the examples above wherein the concentration of NaCl in the brine was increased from 100 grams per liter (Example I) to 200 grams per liter (Example II) and the BET surface area decreased from 114 square meters per gram in Example I to 9 square meters per gram in Example II. This is a very significant contribution to the art.

In other words, the BET surface area of the precipitated product decreases markedly with increasing brine concentrations. By the same token, the solids, as viewed in the electron microscope, become more clearly particulate, and, at higher NaCl concentrations, of larger diameter.

Although NaCl has been mentioned as a preferred alkali metal chloride for precipitating alkali metal silicate, the invention is by no means restricted thereto, since other alkali metal chlorides, such as KCl and LiCl and the like, are suitable and may be substituted for NaCl in the processes defined herein.

According to a still further embodiment of the present invention, it has been found that the quantity of alkali metal silicate precipitated in the reaction mixture can be substantially increased by adding acid, such as HCl, to the filtrate remaining when the reaction mixture is filtered and the precipitated silicate removed. Enough acid is added to the filtrate to increase the $SiO_2$ mol ratio of the silicate dissolved therein to a value at least equivalent to the $SiO_2$ ratio in the silicate prior to its addition to the brine.

Upon adding a sodium silicate solution having an $SiO_2/Na_2O$ mol ratio of 3.22 to a concentrated brine solution, as hereinabove described, the $SiO_2$ mol ratio of the silicate in the resulting filtrate is reduced to a value below 3.22, such as about 2.7. The addition of sufficient acid calculated to increase the $SiO_2/Na_2O$ mol ratio to between about 4.5 and 5.0 results in the formation of further precipitate of sodium silicate, thus affording a greater yield of precipitate, based upon the amount of sodium silicate added to brine.

It has been found that by removing the precipitate and treating the filtrate in the manner just defined, up to about 94 percent by weight of the sodium silicate added to the brine solution may be recovered as a precipitate. Several such treatments are generally required for maximum yield. The precipitate removed from any one of these steps and treated with calcium chloride as shown above, for example, yields a calcium silicate of uniform particle size, usually ranging from 0.2 to 0.7 micron.

A further embodiment of the instant invention involves a one-step alkali metal silicate precipitation method wherein the resulting solution containing alkali metal silicate solids suspended therein is treated with enough HCl, or similar acid, to increase the $SiO_2$ mol ratio in the unprecipitated sodium silicate and thus cause further silicate precipitation. Up to about 80 percent by weight of the alkali metal silicate added to the brine solution is recovered as a precipitate by this method.

Quite obviously, the last-mentioned in situ technique provides a very economical process and affords a method whereby an improved siliceous pigment may be prepared with minimum handling. For instance, without separating the precipitated alkali metal silicate from the reaction solution, the precipitated alkali metal silicate being equivalent to up to about 80 percent by weight of the total alkali metal silicate added to the brine, an alkaline earth metal silicate pigment may be produced by adding an alkaline earth metal salt, such as calcium chloride, to the reaction mixture. The salt reacts with both solid precipitated and dissolved unprecipitated alkali metal silicate. The precipitated silicate yields an alkaline earth metal silicate having an average ultimate particle size ranging between 0.2 to 0.7 micron, and the unprecipitated alkali metal silicate yields an alkaline earth metal silicate having an average ultimate particle size below 0.2 micron, usually about 0.01 to 0.05 micron. Thus, the resulting pigment is made up of up to about 80 percent by weight alkaline earth metal silicate solids of the larger diameter and up to about 20 percent by weight of the smaller diameter solids.

While the present discovery is best carried out at ambient temperatures (22° C., plus or minus five degrees), somewhat higher or lower temperatures are contemplated. For example, temperatures ranging from 5° C. to 100° C. are suitable. If desired, superatmospheric pressure may be applied to the reactants, in which case temperatures higher than 100° C. may be employed.

A very economical and novel method of carrying out the invention involves enriching the alkali metal chloride concentration of the filtrate resulting at any stage of the above process and reacting the enriched filtrate with more alkali metal silicate. For example, the filtrate resulting when an acid is added to the slurry formed by the reaction of an alkali metal chloride solution and an alkali metal silicate solution, as described above, may be enriched with more alkali metal chloride to a concentration of at least 75 grams NaCl per liter and reacted with additional alkali metal silicate solution according to the first step of the present embodiment.

These and many other modifications are clearly within the scope of the instant invention and will be recognized by the skilled chemist. It is not intended, therefore, that the details hereinabove recited should act as restrictions upon the scope of the invention.

We claim:
1. A process of preparing a siliceous pigment which comprises mixing an aqueous solution of alkali metal silicate and alkali metal chloride to precipitate a portion of the $SiO_2$ content of the alkali metal silicate solution as alkali metal silicate having an $SiO_2$ to alkali metal oxide ratio greater than that of said alkali metal silicate solution and form an aqueous slurry thereof, separating precipitated alkali metal silicate from the slurry and reacting an aqueous slurry of separated alkali metal silicate with a compound having a cation which will replace the alkali metal to obtain siliceous pigment.

2. The process of claim 1 wherein the compound is a water-soluble alkaline earth metal salt.

3. The process of claim 1 wherein the compound is calcium chloride.

4. The process of claim 1 wherein the compound is a water-soluble acid.

5. A process of preparing a siliceous pigment which comprises mixing alkali metal chloride and alkali metal silicate in amounts sufficient to establish an alkali metal chloride concentration of at least 75 grams per liter whereby to form an aqueous slurry of precipitated alkali metal silicate, said precipitated alkali metal silicate having a higher mole ratio of $SiO_2$ to alkali metal oxide than that of the alkali metal silicate mixed with the alkali metal chloride, separating from the slurry precipitated alkali metal silicate, reacting an aqueous slurry of separated alkali metal silicate with a compound having a cation which will replace the alkali metal to provide siliceous pigment.

6. The method of claim 5 wherein the concentration of $SiO_2$ established upon mixing is up to 45 grams $SiO_2$ per liter.

7. The process of claim 5 wherein the compound is a water-soluble alkaline earth metal salt.

8. The process of claim 5 wherein the compound is a water-soluble acid.

9. A process of preparing siliceous pigment which comprises mixing alkali metal silicate and alkali metal chloride in an aqueous medium to precipitate alkali metal silicate and form an aqueous slurry thereof containing dissolved alkali metal silicate, said precipitated alkali metal silicate having a higher mole ratio of $SiO_2$ to alkali metal oxide and said dissolved alkali metal silicate having a lower mole ratio of $SiO_2$ to alkali metal oxide than that of the alkali metal silicate mixed with the alkali metal chloride, separating precipitated alkali metal silicate from dissolved alkali metal silicate in the slurry, treating dissolved alkali metal silicate with sufficient water soluble acid to precipitate further alkali metal silicate, separating such further alkali metal silicate precipitate and reacting an aqueous slurry of these separated alkali metal silicates with a compound having a cation which will replace the alkali metal silicate to obtain siliceous pigment.

10. The method of claim 9 wherein the compound is a water soluble acid.

11. A process of preparing siliceous pigment which comprises mixing water soluble alkali metal silicate and alkali metal chloride in an aqueous medium to precipitate alkali metal silicate having a mole ratio of $SiO_2$ to alkali metal oxide greater than said water soluble alkali metal silicate thereby forming an aqueous slurry of precipitated alkali metal silicate containing dissolved alkali metal silicate having an $SiO_2$ to metal oxide mole ratio less than said precipitated alkali metal silicate, separating precipitated alkali metal silicate from dissolved alkali metal silicate in the slurry, adding sufficient water soluble acid to the dissolved alkali metal silicate from which precipitated alkali metal silicate has been separated to precipitate alkali metal silicate of an $SiO_2$-alkali metal silicate mole ratio greater than said dissolved silicate and reacting an aqueous slurry of the alkali metal silicate precipitates with a compound having a cation which will replace the alkali metal silicate to obtain siliceous pigment.

12. The method of claim 11 wherein the compound is a water soluble acid.

References Cited in the file of this patent

UNITED STATES PATENTS

| | | |
|---|---|---|
| 1,964,685 | Folger | June 26, 1934 |
| 2,386,337 | Moyer | Oct. 9, 1945 |
| 2,498,353 | Bierce | Feb. 21, 1950 |
| 2,731,326 | Alexander et al. | Jan. 17, 1956 |
| 2,786,758 | Taylor | Mar. 26, 1957 |

FOREIGN PATENTS

| | | |
|---|---|---|
| 710,015 | Great Britain | June 2, 1954 |

OTHER REFERENCES

Mellor: Treatise on Inorganic and Theoretical Chemistry, vol. 6, pages 321–324, Longmans Green & Co., N.Y., 1925.